United States Patent [19]

Kastin

[11] Patent Number: 4,925,686

[45] Date of Patent: May 15, 1990

[54] LIQUID SHELF-STABLE FREEZABLE FRUIT JUICE CONTAINING COMPOSITION AND METHOD OF MAKING THE SAME

[75] Inventor: Howard Kastin, Atlantic Beach, N.Y.

[73] Assignee: Leader Candies, Inc., New York, N.Y.

[21] Appl. No.: 128,202

[22] Filed: Dec. 2, 1987

[51] Int. Cl.$^5$ .............................................. A23L 2/16
[52] U.S. Cl. .................................. 426/131; 426/330.5; 426/521; 426/548; 426/569; 426/575; 426/599
[58] Field of Search ............... 426/599, 521, 548, 569, 426/575, 330.5, 131

[56] References Cited

U.S. PATENT DOCUMENTS

| | | | |
|---|---|---|---|
| 3,845,231 | 10/1974 | Nagasawa | 426/131 |
| 3,922,361 | 11/1975 | Vann | 426/599 |
| 3,922,371 | 11/1975 | Julien | 426/599 |
| 3,949,098 | 4/1976 | Bangert | 426/599 |
| 4,216,242 | 8/1980 | Braverman | 426/660 |
| 4,235,936 | 11/1980 | Kahm | 426/599 |
| 4,293,580 | 10/1981 | Rubenstein | 426/599 |
| 4,435,439 | 3/1984 | Morris | 426/599 |
| 4,534,991 | 8/1985 | Kryger | 426/599 |
| 4,547,384 | 10/1985 | Kryger | 426/599 |
| 4,609,561 | 9/1986 | Wade | 426/599 |
| 4,738,857 | 4/1988 | Daher et al. | 426/599 |
| 4,790,999 | 12/1988 | Ashmont et al. | 426/592 |
| 4,816,273 | 3/1989 | Smith | 426/529 |
| 4,816,283 | 3/1989 | Wade | 426/599 |
| 4,828,866 | 5/1989 | Wade | 426/599 |
| 4,830,868 | 5/1989 | Wade | 426/599 |
| 4,830,870 | 5/1989 | Davis | 426/599 |

FOREIGN PATENT DOCUMENTS

| | | | |
|---|---|---|---|
| 208212 | 5/1982 | United Kingdom | 426/599 |
| 2120077 | 11/1983 | United Kingdom | 426/599 |

*Primary Examiner*—Carolyn Paden
*Attorney, Agent, or Firm*—Hedman, Gibson, Costigan & Hoare

[57] ABSTRACT

A liquid shelf-stable freezable fruit juice-containing composition which includes fruit juice, a sweetener, at least one pH controlling and stabilizing effective amount of a stabilizer and methods of preparing the same.

30 Claims, No Drawings

LIQUID SHELF-STABLE FREEZABLE FRUIT JUICE CONTAINING COMPOSITION AND METHOD OF MAKING THE SAME

FIELD OF THE INVENTION

The present invention is directed to a freezable food composition and particularly to a liquid fruit juice containing composition which may be stored as a liquid for long periods and then frozen by the consumer to obtain a frozen dessert such as a frozen fruit juice bar.

BACKGROUND OF THE INVENTION

Recently it has been reported that there are over 1,600 varieties of frozen desserts which account for $1.6 billon in sales. U.S. food companies continue to search for different frozen products in response to the apparently insatiable consumer appetite for such products. (*TIME*, June 29, 1987, p. 47).

It is well recognized that consumers are concerned about the content of food products, especially those consumed by children. In the past, the so-called "ice pops", containing primarily artificial ingredients have been a popular source of refreshment. More recently, however, consumers have demanded and U.S. companies have responded with "ice pops" containing real fruit and/or fruit juice marketed under such names as Frozfruit and Fruit 'N Juice.

All real fruit juice containing frozen products are shipped to retail outlets in frozen form and must stored in freezers. The cost of storing frozen products and the space available for storage has caused problems for the retailer and the consumer as evidenced by the relatively high cost of such products.

Applicant has discovered a real fruit juice containing composition and method of preparing the same which permits the product to be shipped to and stored in a retail store as a liquid and then frozen at home by the consumer. As a result, the product of the present invention is less costly to produce because it may be stored in the non-frozen section of the supermarket.

It is therefore an object of the invention to provide a liquid shelf-stable freezable fruit juice containing composition.

It is a further object of the invention to provide a dessert product which can be stored for long periods of time at room temperature and then frozen when desired by the consumer.

It is still another object of the invention to provide a method of producing a packaged liquid shelf-stable freezable fruit juice containing food product.

SUMMARY OF THE INVENTION

The present invention is directed to a liquid shelf-stable freezable fruit juice containing composition which comprises:
(a) fruit juice;
(b) a sweetener;
(c) a stabilizer; and
(d) a pH controlling agent.

It is also characteristic of the present composition that it essentially be free of yeast, mold and bacteria.

The present invention is also directed to a method of preparing the above-described composition. The method comprises heating fruit juice and the sweetener at a temperature and for a sufficient time to pasteurize the mixture.

The pasteurized mixture is combined with the stabilizer and pH controlling agent under conditions which maintain a substantially yeast, mold and bacteria free environment. The resulting liquid product is packaged under conditions which likewise prevent an undesirable amount of contamination by yeast, mold and/or bacteria.

DETAILED DESCRIPTION OF THE INVENTION

The fruit juice employed in the present composition may be in the form of natural fruit juice or as a concentrate. The preparaton of concentrates from natural fruit juice is well-known to those skilled in the art. If a concentrate is used, water will be required to produce a liquid product. The flavor of the juice is unlimited and can include apple, orange, pineapple, berry and other flavors alone or in combination.

The amount of the fruit juice or concentrate plus water in the composition is in the range of from about 10 to 99% by weight. The Food and Drug Administration requires that a product advertised as a fruit juice product must contain at least 10% fruit juice and to be advertised as a fruit juice "bar" it must contain at least 80% fruit juice. Accordingly, the composition should contain at least 10% fruit juice. The actual amount of fruit juice is not critical to the invention and may be selected according to taste and economic considerations.

The sweetener may be selected from sugar (e.g., cane sugar), a sugar containing product which includes, for example, corn syrup, high fructose corn syrup, hydrogenated starch hydrolysate, and the like. The sweetener may also be selected from synthetic compounds such as saccharin and aspartame. The amount of the sweetener is selected in accordance with the desired sweetness of the product and is typically in the range of from about 1 to about 20% by weight.

Of particular importance in the composition is the use of a substance which stabilizes the product under ambient conditions and allows the components of the product to be uniformly suspended in the liquid and remain uniformly suspended upon freezing. When the product is thereafter frozen, it has a uniform taste, appearance and texture making it an appealing frozen dessert.

The stabilizers used in the present invention may include carboxymethyl cellulose (CMC), Xanthan gum, locust bean gum and carrageenan. The amount of the stabilizer is within the range of from about, 0.01 to 0.02% by weight, preferably about 0.015% by weight.

The pH control agent may include any weak organic acid suitable for consumption including, for example, fumaric acid, citric acid, tartaric acid and the like. Such substances also have the effect of imparting a tartness to the taste of the final product. The amount of the pH control agent is from about 0.1 to 0.2% by weight.

The composition may also be provided with standard additives such as preservatives, flavor and color enhancing agents known to those in the food industry. In addition, starch may be added in known amounts to impart a creamy texture to the final product. The preservatives include potassium sorbate and sodium benzoate and may be added to the compositon in known amounts of from less than about 0.1 to 1.0% by weight. Known flavor and color enhancing agents may be added separately or in amounts known to those skilled in the art (e.g. about 0.25 to 0.5% by weight).

The packaged composition of the present invention can be prepared by heating the fruit juice and sweetener to a temperature of from 185 to 200° F. for about 5 to 10 minutes until pasteurization of the mixture is complete. At least one stabilizer such as CMC, at least one pH control agent such as fumaric acid and any of known stabilizers, flavorings and color enhancing agents are then added to the pasteurized mixture under stirring. The addition of the stabilizer and pH control agent as well as the specified additives is carried under conditions which insure that the resulting liquid composition is essentially free of yeast, mold and bacteria.

Packaging of the product takes place under sterile conditions to prevent contamination. This can be accomplished by hermtically sealing the liquid composition in suitable plastic or plastic lined containers at a temperature of from about 120 to 140° F.

If desirable, the flavor and color enhancing agents may be pasteurized prior to their addition into the product mixture.

In accordance with the invention, a variety of frozen products can be made such as "ice pops", cups, popsicles, etc. and, as previously indicated, each such product may be prepared in any one of a multitude of fruit juice flavors.

EXAMPLE 55 gallons of apple juice concentrate, 330 gallons of water and 77 gallons of high fructose corn syrup were placed in a previously sterilized vat and heated to 195° F. for 5 minutes under stirring until pasteurization wa complete.

While maintaining the pasteurized product at the same temperature, 24 ounces of carboxymethyl cellulose, 8 pounds of fumaric acid, 1 pound each of sodium benzoate and potassium sorbate and 48 ounces of an emulsion (ICE Novelty Cherry Emulsion, sold by Virginia Dare, Inc. of Brooklyn, New York), containing a cherry flavor and color enhancer were added to the mixture.

The resulting mixture was poured into two ounce plastic envelopes made of laminated polyethylene/polyester at about 130° F. Each of the envelopes was hermetically sealed and allowed to cool.

The packages were then stored at room temperature for 180 days. No visible evidence of product breakdown was observed.

The packages were then placed in a freezer maintained at 20° F. until frozen. The product was found to have a pleasant fruity apple taste consistent with uniform distribution of the components of the composition.

What I claim is:

1. A freezable fruit juice containing composition which is both a liquid and shelf stable at room temperature, said composition consisting essentially of:
   (a) 10 to 99% by weight of fruit juice;
   (b) a sweetener;
   (c) 0.01 to 0.02% by weight of a non-alcoholic stabilizer; and
   (c) a pH control agent.

2. The composition of claim 1, wherein the amount of sweetener is from about 1 to 20% by weight based on the overall weight of the composition.

3. The composition of claim 1, wherein the stabilizer is selected from carboxymethyl cellulose, Xanthan gum, locust bean gum and carrageenan, and mixtures thereof.

4. The composition of claim 1, wherein the pH control agent is selected from fumaric acid, citric acid, tartaric acid, and mixtures thereof.

5. The composition of claim 1, wherein the sweetener is selected from corn syrup, high fructose corn syrup, sugar and synthetic sugar sweeteners.

6. The composition of claim 5, wherein the synthetic sweeteners are selected from saccharin and aspartame.

7. The composition of claim 1, wherein the amount of fruit juice is at least 80% by weight.

8. The composition of claim 1, further comprising at least one substance selected from flavoring agents, coloring agents, preservatives, starch, and mixtures thereof.

9. The composition of claim 1 consisting essentially of:
   (a) fruit juice in an amount of from about 10 to 99% by weight;
   (b) a sweetener in an amount of from about 1 to 20% by weight;
   (c) a non-alcoholic stabilizer in an amount of from about 0.01 to 0.02% by weight;
   (d) a pH control agent in an amount of from about 0.01 to 0.2% by weight;
   (e) at least one preservative in an amount of from about 0.01 to 1.0% by weight;
   (f) a flavor enhancing effective amount of a flavoring agent;
   (g) a color enhancing effective amount of a coloring agent.

10. A method of producing a freezable fruit juice composition which is both a liquid and shelf-stable at room temperature comprising:
    (a) heating 10 to 99% by weight of fruit juice and a sweetener to a temperature and for a time sufficient to pasteurize the mixture;
    (b) adding, either separately or together to the pasteurized mixture, 0.01 to 0.02% by weight of a non-alcoholic stabilizer, and a pH control agent under conditions which substantially prevent the presence of yeast, mold and bacteria to produce a liquid composition; and
    (c) packaging the liquid composition under conditions which insures that the packaged composition is substantially free of yeast, mold and bacteria.

11. The method of claim 10, wherein step (a) is conducted at a temperature of from about 185 to 200° F.

12. The method of claim 11, wherein the temperature is about 195° F.

13. The method of claim 10, wherein the step of packaging the liquid composition is conducted at a temperature of from about 120 to 140° F.

14. The method of claim 10, wherein the stabilizer is selected from carboxymethyl cellulose, Xanthan gum, locust beam gum, and carrageenan, and mixtures thereof.

15. The method of claim 10, wherein the pH control agent is selected from fumaric acid, citric acid, tartaric acid, and mixtures thereof.

16. The method of claim 10, wherein the sweetener is selected from sugar, corn syrup, high fructose corn syrup, and synthetic sweeteners.

17. The method of claim 16, wherein the synthetic sweeteners are selected from saccharin and aspartame.

18. The method of claim 10, wherein the amount of the sweetener is from about 1 to 20% by weight based on the weight of the overall composition.

19. The method of claim 10, further comprising adding to the prepackaged liquid composition at least one substance selected from flavoring agents, coloring agents, preservatives, starch and mixtures thereof.

20. The method of claim 10, wherein the amount of fruit juice is at least 80% by weight.

21. A freezable fruit juice containing composition which is both a liquid and shelf stable at room temperature, said composition being produced by the process comprising:
   (a) heating 10 to 99% by weight of fruit juice and a sweetener to a temperature and for a time sufficient to pasteurize the mixture;
   (b) adding, either separately or together to the pasteurized mixture, 0.01 to 0.02% by weight of a non-alcoholic stabilizer, and a pH control agent under conditions which substantially prevent the presence of yeast, mold and bacteria to produce a liquid composition; and
   (c) packaging the liquid composition under conditions which insures that the packaged composition is substantially free of yeast, mold and bacteria.

22. The composition of claim 21, wherein step (a) is conducted at a temperature of from about 185 to 200° F.

23. The composition of claim 21, wherein the step of packaging the liquid composition is conducted at a temperature of from about 120° to 140° F.

24. The composition of claim 21, wherein the stabilizer is selected from carboxymethyl cellulose, Xanthan gum, locust bean gum, and carrageenan, and mixtures thereof.

25. The composition of claim 21, wherein the pH control agent is selected from fumaric acid, citric acid, tartaric acid, and mixtures thereof.

26. The composition of claim 21, wherein the sweetener is selected from sugar, corn syrup, high fructose corn syrup, and synthetic sweeteners.

27. The composition of claim 21, wherein the synthetic sweeteners are selected from saccharin and aspartame.

28. The composition of claim 21, wherein the amount of the sweetener is from about 1 to 20% by weight based on the weight of the overall composition.

29. The composition of claim 21, further comprising adding to the prepackaged liquid composition at least one substance selected from flavoring agents, coloring agents, preservatives, starch and mixtures thereof.

30. The composition of claim 21, wherein the amount of fruit juice is at least 80% by weight.

* * * * *